(12) United States Patent
Walker

(10) Patent No.: US 11,835,402 B2
(45) Date of Patent: Dec. 5, 2023

(54) SOFT ELECTRONIC COMPONENT WITH IMPROVED CONNECTION

(71) Applicant: SENSOR HOLDINGS LIMITED, Auckland (NZ)

(72) Inventor: Christopher Robert Walker, Auckland (NZ)

(73) Assignee: SENSOR HOLDINGS LIMITED, Auckland (NZ)

( * ) Notice: Subject to any disclaimer, the term of this patent is extended or adjusted under 35 U.S.C. 154(b) by 732 days.

(21) Appl. No.: 16/977,528

(22) PCT Filed: Mar. 5, 2019

(86) PCT No.: PCT/NZ2019/050022
§ 371 (c)(1),
(2) Date: Sep. 2, 2020

(87) PCT Pub. No.: WO2019/172781
PCT Pub. Date: Sep. 12, 2019

(65) Prior Publication Data
US 2020/0408617 A1    Dec. 31, 2020

(30) Foreign Application Priority Data
Mar. 5, 2018  (AU) ................................ 2018900709

(51) Int. Cl.
*G01L 1/14*         (2006.01)
*H01G 9/048*       (2006.01)
*H01G 9/07*         (2006.01)
*H01G 9/08*         (2006.01)

(52) U.S. Cl.
CPC ............. *G01L 1/144* (2013.01); *H01G 9/048* (2013.01); *H01G 9/07* (2013.01); *H01G 9/08* (2013.01)

(58) Field of Classification Search
CPC ......... G01L 1/144; G01L 1/142; H01G 9/048; H01G 9/07; H01G 9/08; H01G 9/04
See application file for complete search history.

(56) References Cited

U.S. PATENT DOCUMENTS

| 2012/0228109 | A1  | 9/2012 | Wang et al. |
| 2014/0174204 | A1* | 6/2014 | Chen ................. G01L 5/226 156/182 |
| 2016/0283006 | A1  | 9/2016 | Ogura et al. |
| 2017/0156636 | A1  | 6/2017 | Kawamura |
| 2017/0219443 | A1  | 8/2017 | Davis et al. |

FOREIGN PATENT DOCUMENTS

JP    2017026395           2/2017
WO    WO-2015003891 A1 *   1/2015  ........... G06K 9/0002

\* cited by examiner

*Primary Examiner* — David Z Huang
(74) *Attorney, Agent, or Firm* — Leason Ellis LLP

(57) ABSTRACT

In one aspect the invention provides a soft electronic component having a signal electrode and one or more shielding electrodes overlapping the signal electrode to shield the signal electrode, wherein the soft electronic component is arranged to provide one or more signal-coupling regions in which the signal electrode is exposed by the one or more shielding electrodes to allow capacitive coupling of the signal electrode to a signal electrode of another component, wherein the one or more shielding electrodes are arranged to provide one or more shield-coupling regions to allow the capacitive coupling of a shielding electrode to the other component, and wherein the coupling region is covered by a dielectric material.

12 Claims, 6 Drawing Sheets

SOFT ELECTRONIC COMPONENT WITH IMPROVED CONNECTION

CROSS-REFERENCE TO RELATED PATENT APPLICATIONS

This application is a U.S. National Phase Application under 35 U.S.C. § 371 of International Patent Application No. PCT/NZ2019/050022, filed Mar. 5, 2019, which claims the priority of AU Patent Application No. 2018900709, filed Mar. 5, 2018, each of which is incorporated by reference as if expressly set forth in their respective entirety herein.

FIELD OF THE INVENTION

This invention relates to a signal transmission apparatus for a soft flexible electrical component. In various embodiments the invention provides a signal transmission apparatus for one or more strain sensors formed from soft flexible electrical components, and in some optional embodiments may provide a power transmission apparatus for soft flexible electrical components. In further embodiments the invention may provide portions of a communications system for soft flexible component electrical circuits formed from modular elements.

BACKGROUND OF THE INVENTION

Flexible and compliant circuits incorporating soft flexible electrical components are ideal building blocks for integration into soft structures. They can provide advanced functionality, whether that be in the form of control, logic, or electromechanical transducer elements, for example, without substantially affecting the mechanical behaviour of the structure. Stretch or strain sensors are forms of soft flexible electrical components which have an electrical characteristic which varies as the sensor is stretched. In various applications these sensors need to stretch by one or two times the original length of the length of the sensor.

Flexible and compliant circuits such as those incorporating a soft capacitor, or other flexible and compliant sensing devices are excellent sensors for soft structures such as the human body. As is typical of soft structures, the human body is capable of large, complex movements in 3D space.

It is challenging to attach traditional sensing elements to such a structure where the sensing device has rigid elements. These elements can interfere with the behaviour of the soft structure and create soft-to-hard interfaces that are prone to mechanical failure. Intermediate transmission mechanisms are required to convert the large movement of the body to a constrained range and/or type of motion that is appropriate for a sensor, and these add complexity and potentially sources of error.

Conversely, flexible and compliant circuits eliminate the need for complicated intermediate transmission mechanisms. They are capable of conforming to soft bodies, and by virtue of being made of soft materials, can deform into complicated shapes to ensure they stay conformed to the body for a large range of motion. For example, a flexible and compliant second skin could be instrumented with flexible and compliant sensors so that as the body moves, the second skin stretches in synchrony with the actual skin, transmitting stretch information to the stretch sensitive flexible and compliant circuits so that it can be digitized and used as an input for a larger system.

However, in applications which use such technology in combination with wearable apparel a user is likely to need several individual garments to clothe themselves. At present the current state of the art does not allow for signal transmission or communication links between components across individual pieces of apparel.

Flexible and compliant capacitive circuits are especially well suited to measurement roles with soft structures. They are sensitive to changes in geometry, but exhibit minimal sensitivity to humidity and temperature, and can easily be electrically shielded to block external sources of electrical noise. A challenge however lies in that a flexible and compliant capacitive sensor often must interface with conventional electronics that are either rigid or flexible but not compliant. This requires an electro-mechanical connection between the electrically conductive regions or structures of the flexible and compliant circuit and the rigid/flexible circuit.

One solution to this issue to expose the electrically conductive layers or components of the flexible and compliant circuit so that the corresponding electrically conductive terminal of the rigid/flexible circuit can be brought into direct mechanical contact. This however then raises the challenge of ensuring continuous contact is maintained when the flexible and compliant structure is deformed in line with its designed use. Without additional mechanical support, the flexible and compliant circuit, when deformed, may easily separate from the rigid/flexible circuit, thus resulting in mechanical failure.

An alternative approach is pinning the connection with the use of a crimp-style connector with teeth that penetrate to the electrically conductive layers or structures of the flexible and compliant circuit. However, this approach necessarily requires that the terminals of the flexible and compliant circuit are exposed while the connection is made, and additional processing steps are required after the connection is made to fully seal or protect the flexible and compliant circuit. Furthermore, the terminals of the flexible and compliant circuit must be configured such that teeth do not also penetrate through electrically conductive layers that are not carrying the same signal. By piercing the flexible and compliant circuit this can also create mechanical weak points that cause the connection to degrade over time with repeated mechanical cycling.

As can be appreciated by those skilled in this field the above approaches cause problems when the circuit is to be used in a wet environment. Water can exacerbate corrosion problems and also course signal noise and short-circuits to occur.

These prior art connection methods are also permanent approaches, causing problems in applications which require these components to be quickly disconnected and reconnected with one another.

Furthermore, existing prior art connections also relying on mechanical connections being made to the exposed conductive structures of a soft flexible electrical component. The exposure of these conductive structures can also require further processing and manufacturing techniques when these components are to be used in wet or hostile environments.

It is desirable therefore to create a signal transmission apparatus that allows electrical communication without the need to pierce or otherwise compromise the structural integrity of the soft circuit. Preferably such a signal transmission apparatus would simultaneously simplify production by reducing the number of post processing steps following the establishment of a connection.

It would therefore be of advantage to have an improved approach to providing a signal transmission apparatus for a soft flexible electrical component which addressed any of the above problems with the prior art or at least provided the public with an alternative choice.

It would also be of advantage to have an improved signal transmission apparatus which provided soft flexible component electrical circuits formed from modular elements which could be easily connected and disconnected from one another.

DISCLOSURE OF THE INVENTION

In one aspect the invention provides a soft electronic component having a signal electrode and one or more shielding electrodes overlapping the signal electrode to shield the signal electrode, wherein the soft electronic component is arranged to provide one or more signal-coupling regions in which the signal electrode is exposed by the one or more shielding electrodes to allow capacitive coupling of the signal electrode to a signal electrode of another component.

The coupling region may be covered by a dielectric encapsulating layer.

The one or more shielding electrodes may be arranged to provide one or more shield-coupling regions to allow the capacitive coupling of a shielding electrode the other component.

One or more of the shielding electrodes may be arranged to provide a shielding-coupling region about the signal-coupling region.

The soft electronic component may comprise a first shielding electrode which exposes the signal-coupling electrode of the signal-electrode region on a first side.

The first shielding electrode may be arranged to entirely cover the signal electrode other than in the signal-coupling region.

The electronic component may comprise a second shielding electrode which substantially covers the signal electrode on a second side which is distal from the first side to provide continuous shielding for the signal electrode on the second side.

The signal-electrode, and one or more shielding electrodes may be formed of layers of stretchable and/or compliant material.

The layers may be formed of films of material.

The films of material may comprise an additive to impart a conductive property to an otherwise dielectric material to form the electrodes.

The films forming electrodes may be separated by films of elastic dielectric material.

The films may be elastic.

The signal electrode may comprise a section which is arranged to stretch to change geometry of the electrode.

The electronic component may comprise an operational section which is arranged to provide an electrical characteristic for the component.

The soft electronic component may comprise a sensor section which is adapted to deform to change geometry of signal and shielding electrodes to change an electrical property of the sensor section to allow sensing of deformation.

In another aspect the invention provides an assembly comprising an electronic component having an operational section which is arranged to provide an electrical characteristic for the component and comprising a coupling section arranged to capacitively couple with a coupling element to couple a signal from the operational section, wherein the coupling section of the soft electronic component comprises a signal electrode shielded by one or more shielding electrodes and exposed by the one or more shielding electrodes to provide a signal-coupling region for a co-operating signal-coupling region of the coupling element and wherein the coupling section of the shielding electrode provides a shielding-coupling region for a co-operating shielding-coupling region of the coupling element.

The electronic component be a soft electronic component.

The assembly may comprise a coupling element having:
a co-operating signal-coupling region arranged to form a capacitance with the signal-coupling region of the signal electrode of the component; and
a co-operating shielding-coupling region arranged to form a capacitance with the shielding-coupling region of the component.

The co-operating signal-coupling region may be arranged a substantially flat face.

The co-operating shielding-coupling region may be arranged at the same substantially flat face as the co-operating signal-coupling region.

In another aspect the invention provides a soft electronic component having a signal electrode and one or more reference electrodes overlapping the signal electrode and providing a signal reference, wherein the soft electronic component is arranged to provide one or more signal-coupling regions in which the signal electrode is exposed by the one or more reference electrodes to allow capacitive coupling of the signal electrode to a signal electrode of another component.

The one or more shielding electrodes may be arranged to provide one or more reference-coupling regions to allow the capacitive coupling of a reference electrode the other component.

In another aspect the invention provides a component formed of films of dielectric material separating films of dielectric material having dispersed material to impart conductivity, wherein the conductive films separated by the dielectric films provide a signal electrode and one or more shielding electrodes in the form of a sheet, wherein the one or more shielding electrode overlap and extend beyond the signal electrode to shield the signal electrode, and wherein at a coupling section of the sensor one or more of the shielding electrodes defines a signal-coupling aperture over a signal-coupling region of the signal electrode and wherein at a coupling section of the sensor one or more of the shielding electrodes defines a shielding coupling region of the shielding electrode.

A capacitance may be formed between the signal electrode and one or more shielding electrodes The component may be a sensor.

The shielding-coupling region may be arranged about the signal-coupling region to shield the signal-coupling region.

The sensor may be formed substantially as a sheet.

The shielding-coupling region may be arranged about the signal-coupling region so as to shield the signal-coupling region parallel to the sheet.

The shielding-coupling region may extend about the signal coupling region.

The signal-coupling region and shielding-coupling region may be covered by dielectric material to isolate the signal electrode and shielding electrode from conductive contact with the environment.

The component may be elongate.

The component may me stretchable to a multiple of it's original length.

The component bay be adapted to be bonded to a substrate material.

In another aspect the invention provides a coupling element having a signal-coupling-electrode and a one or more shielding-coupling electrodes, the one or more shielding electrode arranged to shield the signal-coupling electrode wherein the signal-coupling electrode is exposed by the shielding electrode to provide a signal-coupling region for the coupling element and wherein the shielding-coupling electrode forms a shield-coupling region for the coupling element wherein the said shield-coupling region is arranged about said signal-coupling region.

The signal-coupling region and shielding coupling region may be arranged substantially at a flat coupling-face of the coupling element.

In another aspect the invention provides an electronic component assembly comprising a component formed of films of dielectric material separating films of dielectric material having dispersed material to impart conductivity, wherein the conductive films separated by the dielectric films provide a signal electrode and one or more shielding electrodes for the signal electrode, wherein the one or more shielding electrodes overlap and extend beyond the signal electrode to shield the signal electrode, and wherein at a coupling section of the component one or more of the shielding electrodes defines a first signal-coupling aperture where the signal electrode is exposed at a face of the component by the one or more shielding electrodes, and wherein at the coupling section of the component one or more of the shielding electrodes define a first shielding-coupling region at the face of the component for the shielding electrode;

the assembly further comprising a coupling element having a coupling-signal-electrode and one or more coupling-shielding-electrodes, the one or more coupling-shielding-electrodes arranged to overlap and extend beyond to coupling-signal electrode to shield the coupling-signal electrode, and wherein the one or more coupling-shielding-electrodes defines a second signal-coupling aperture over the coupling-signal electrode where the coupling-signal electrode is exposed at a co-operating face of the coupling element, and wherein the one or more coupling-shielding electrodes define a second shielding-coupling region at the co-operating face of the coupling element, and wherein the second signal-coupling aperture has a co-operating shape with the first signal-coupling aperture such that the signal electrode and signal-coupling electrode capacitively couple when said first and second apertures are aligned and the face of the component is proximate the co-operating face of the coupling element, and wherein the second shielding-coupling region has a co-operating shape with the first shielding-coupling region such that the shielding electrode and coupling-shielding electrode capacitively couple when said first and second apertures are aligned and the face of the component is proximate the co-operating face of the coupling element.

The said second shielding-coupling region may be arranged about said second signal-coupling aperture The component may be a sensor.

The shielding-coupling region may be arranged about the signal-coupling region to shield the signal-coupling region.

The sensor may be formed substantially as a sheet.

The shielding-coupling region may be arranged about the signal-coupling region so as to shield the signal-coupling region parallel to the sheet.

The shielding-coupling region may extend about the signal coupling region.

The signal-coupling region and shielding-coupling region may be covered by dielectric material to isolate the signal electrode and shielding electrode from conductive contact with the environment.

The component may be elongate.

The component may me stretchable to a multiple of it's original length.

The component bay be adapted to be bonded to a substrate material.

BRIEF DESCRIPTION OF THE DRAWINGS

Additional and further aspects of the present invention will be apparent to the reader from the following description of embodiments, given in by way of example only, with reference to the accompanying drawings in which.

Further aspects of the invention will become apparent from the following description of the invention which is given by way of example only of particular embodiments.

BEST MODES FOR CARRYING OUT THE INVENTION

Figure 1:
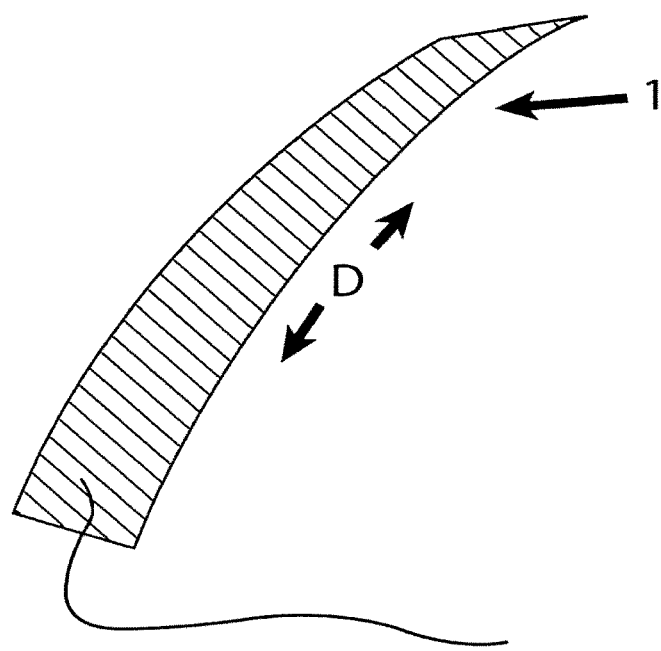
FIG. 1 shows an operational section of a soft electronic component according to an embodiment of the present invention.

FIG. 1 shows an illustrative operational section 1 of a soft electronic component according to an embodiment of the present invention.

In this embodiment the operational section is a capacitive sensor 1. The capacitive sensor of this example is elongate and stretched predominantly in direction D. The capacitive sensor 1 has a capacitance which changes with the geometry of the sensor as it is deformed, by stretch or compression for example. Measuring the capacitance of the sensor 1 allows deformation to be measured and instrumented. In this example the capacitive sensor 1 is used to sense stretch in a material onto which the capacitive sensor is affixed.

Figure 2:
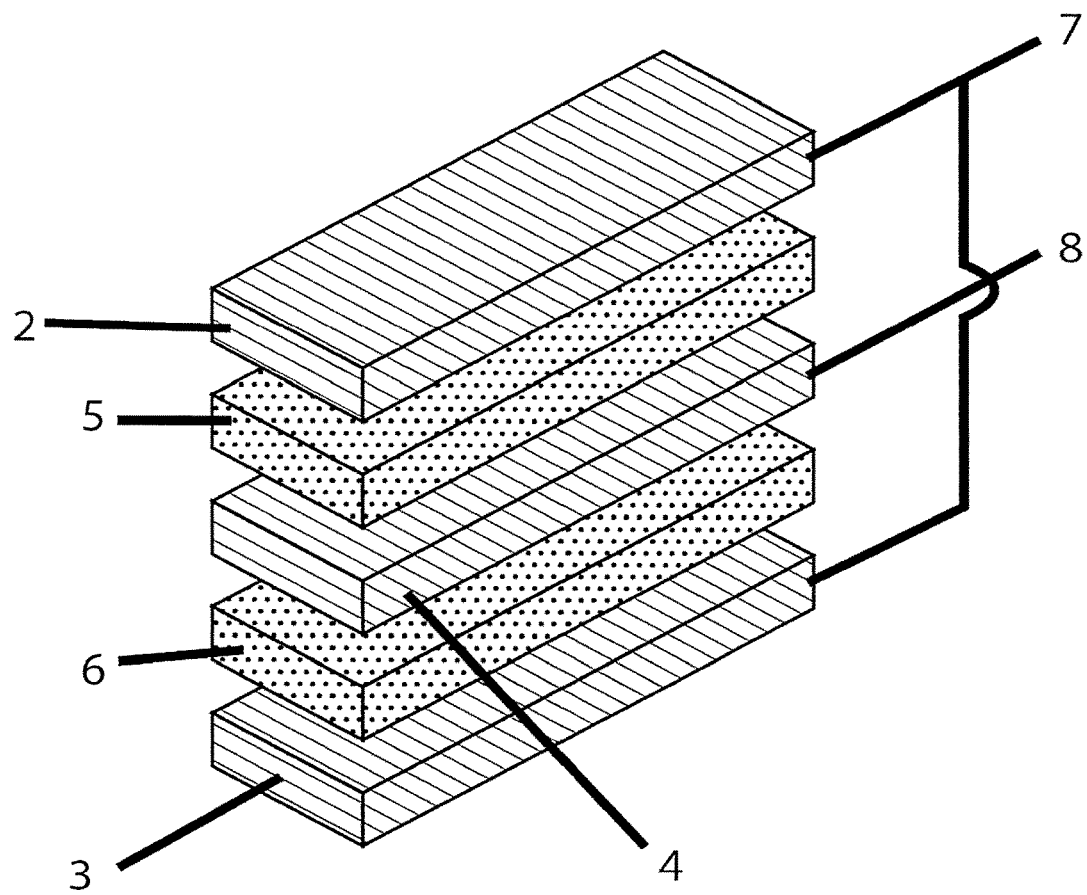
FIG. 2 shows an exploded view of the operational section of a soft electronic component of FIG. 1.

FIG. 2 shows an exploded view of the capacitive sensor 1. The sensor 1 has outer electrodes 2 and 3 and an inner electrode 4 formed of a conductive material. In this example the conductive material of the electrodes 2, 3 and 4 have a resistance in the order of Ohms.

As shown, the inner electrode 4 separated from the outer electrodes 2 and 3 by dielectric layers, or dielectrics, 5 and 6. The outer electrodes 2 and 3 are connected in common to an outer electrode terminal 7 and the inner electrode is connected to an inner electrode terminal 8. The dielectrics 5 and 6 separate the outer electrodes 2 and 3 from the inner electrode 4 to provide a capacitance measurable across terminals 7 and 8 which are included here for the purpose of illustrating the properties of the capacitor only and do not illustrate how the capacitor may be connected to sensing electronics for example As the reader will appreciate a change in geometry of the capacitive sensor 1 will change the geometry of the electrodes 2, 3 and 4 and will change the capacitance. For example, the overlapping area of the outer electrodes 2 and 3 with respect to the inner electrode 4 may change resulting in a changed capacitance.

Also for example if the separation of the outer electrodes 2 and 3 from the inner electrode 4 is changed the capacitance will change also.

As the reader will appreciate various types of measurements may be made by measuring capacitance of the capacitive sensor 1. To name one example, a capacitive sensor 1 may have a calibrated capacitive characteristic which allows a length or degree of stretch or other deformed state of the capacitive sensor 1 to be measured by measuring capacitance of the sensor. Also for example, capacitance may be measured at different times to calculate a change in capacitance to sense the occurrence of deformation or degree of stretch.

The capacitance of a capacitive sensor, such as shown in FIG. 1 and FIG. 2 can be expressed as:

$$C=2\times(\varepsilon_0 \times \varepsilon r \times A)/t \qquad \text{Equation 1,}$$

where C is the capacitance, A is the electrode area and t is the thickness of the dielectric material which separates the electrodes, $\varepsilon_0$ is the permittivity of a vacuum, and $\varepsilon_r$ is the relative permittivity of the dielectric material.

Figure 3:
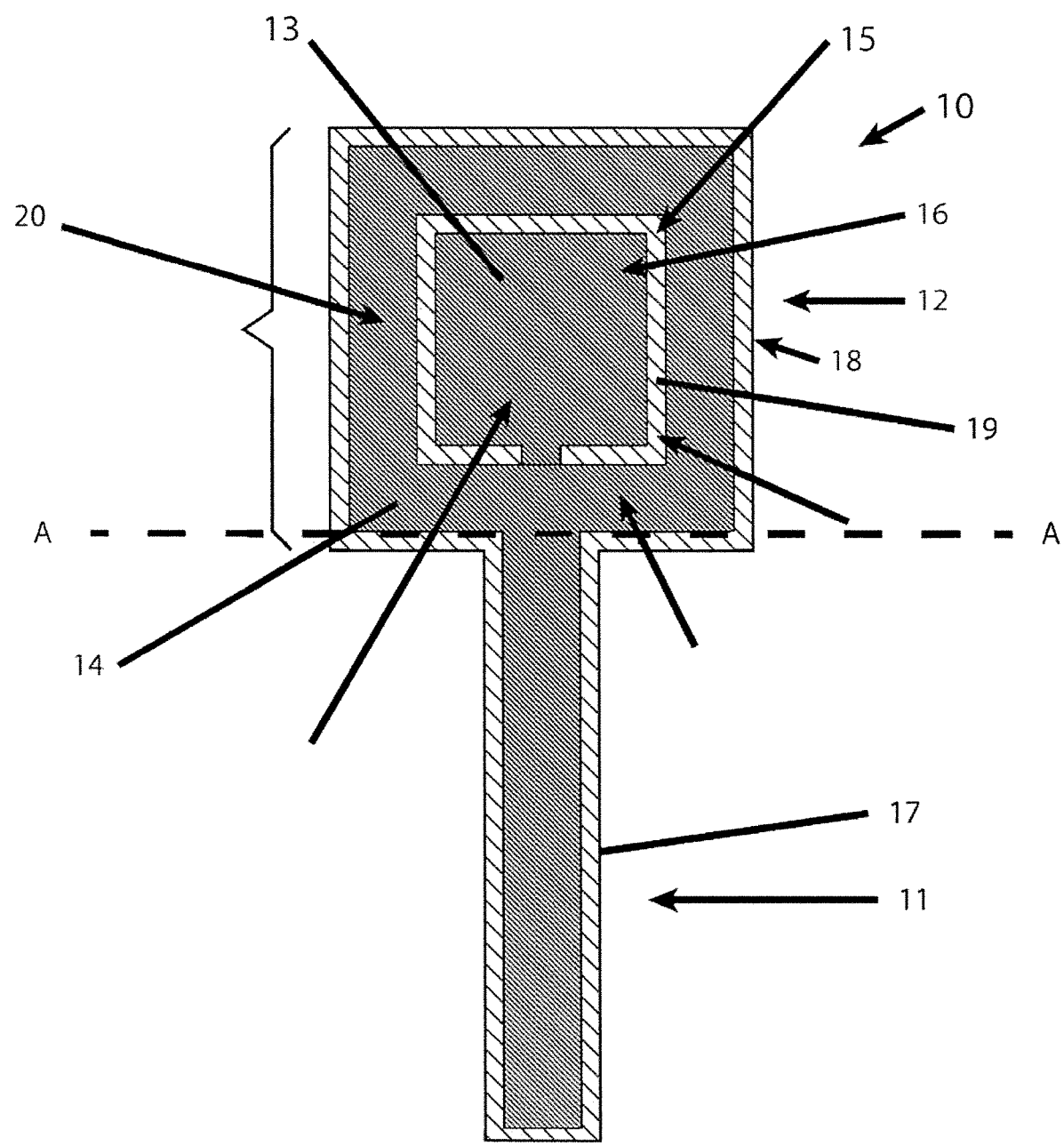
FIG. 3 shows a plan view of a soft electronic component according to another embodiment f the invention.

FIG. 3 shows an electronic component 10 according to an embodiment of the present invention. In this particular embodiment the component is a soft electronic component formed of dielectric layers of elastomeric material and layers of elastomeric material which are conductive to provide electrodes. The component 10 of this embodiment has dielectric layers separating and encapsulating three electrode layers providing the signal electrode and two shielding electrodes. The electrodes are separated by dielectric layers. Specifically, in the embodiment shown a signal electrode (not shown) is arranged between two shielding layers which overlap and extend beyond the signal electrode to shield the signal electrode from external electromagnetic noise.

As illustrated with reference to FIGS. 1 and 2 illustrating a similarly functioning component a capacitance is formed between signal electrode and the overlapping shielding electrodes and provides an electrical characteristic in the form of a capacitance. Changes in the geometry of the component 10, by deformation for example, change the capacitance of the component 10 to allow sensing of the deformation.

The component of this embodiment has an operational, functional or sensing section 11 which provides an electrical characteristic and is deformable to sense the electrical characteristic, such as impedance or capacitance, to vary with deformation of the section 11.

An electrical signal from the operational section 11, or an interrogating signal returned by the operational section 11, allows variation in the electrical characteristic to be sensed by sensing electronics to sense deformation of the operational section.

The soft electronic component 10 has a coupling section 12 which allows the component 10 to be capacitively coupled to a coupling element (not shown).

In the embodiment shown in FIG. 3 the signal electrode 13, first electrode 14 and second electrode (not shown) are provided as layers of conductive material separated by layers of dielectric material. The dielectric material encapsulates the electrodes and may be referred to as encapsulating material or an encapsulating layer.

FIG. 3 shows a signal electrode layer 13 which is located between a first, or upper, shielding electrode layer 14 and a second, or lower, shielding electrode layer (not shown).

In the operational section 11 the signal electrode 13 has smaller dimensions than the shielding electrode 14. In this particular embodiment, the first shielding electrode 14 and second shielding electrode (not shown) overlap and extend beyond the signal electrode so the signal layer is shielded.

In the coupling section 12, the upper shielding layer 14 defines a signal-coupling, or shield aperture, 15 which exposes the signal electrode 13 to provide a signal-coupling region 16. The signal-coupling region 16 being exposed by the shield-aperture 15 of the upper shielding electrode 14 allows coupling of the signal electrode 13 to a co-operating signal-coupling electrode (not shown) of a coupling element (not shown). The coupling element is able through this capacitive coupling to receive a signal from the signal electrode 13 to connect the signal to sensing electronics (not shown). By this means a signal can be transmitted from the component 10.

In this embodiment the signal electrode 13, including the signal-coupling region 16 is encapsulated by dielectric material 17. Therefore, the electrodes 13 and 14 are isolated in terms of direct electrical contact from the surrounds.

In this embodiment the dielectric material forms a layer 18 over the signal-coupling region 16 of the signal electrode 13. The dielectric layer 18 separates the signal-coupling region 16 of the signal electrode layer 13 from the similar signal-coupling region (not shown) of an electrode (not shown) of the coupling element (not shown) to provide a capacitance over which the signal electrode 13 and similar electrode (not shown) of a coupling element can couple.

In this embodiment the shield aperture 15 is wider and longer than the signal-coupling region 16. This allows separation of the signal electrode and shielding electrode in the plane of the coupling section 12. A band of separating dielectric material 19 is shown in FIG. 3 separating the electrodes 13 and 14 in the plane of the signal-coupling region 16.

In this embodiment the same dielectric layer encapsulates and insulates the signal-coupling region 16 of the signal electrode 13.

The shielding electrode 14 which defines the signal-coupling aperture 15 is also exposed to the same side of the component 10, out of the page as shown in FIG. 3. This provides the shielding electrode 14 with a region 20 located about the signal-coupling region 16 of the signal electrode 13. This region 20 serves to shield the signal-coupling region 16, for example from the side as shown in FIG. 3.

The region 20 of the shielding electrode is exposed similarly to the signal-coupling region 16 at a side of the component and is similarly, in this embodiment, covered by the dielectric, encapsulating material. The region 20 therefore can capacitively couple to a co-operating electrode of a coupling element (not shown) to couple the shielding electrode 14 to sensing circuitry and may be referred to as a shielding-coupling region 20.

Therefore, the coupling section 12 of the component 10 provides capacitive coupling to a coupling element for both the signal electrode 13 and the shielding electrode 14. Specifically, the coupling section 12 has a signal-coupling region 16 of a signal electrode 13 and a shielding-coupling region 20 of the shielding electrode 14. The shielding-coupling region is arranged about the shielding coupling region 16, and so shields the signal-coupling region 16 of the signal coupling region 13. If a shielding-coupling region of a cooperating coupling element is similarly arranged about a signal-coupling region, then signal electrodes of the component and coupling element will be shielded at the point they capacitively couple. This means it is possible to provide a substantially continuously shielded signal path for a signal from the operational section 11, across a capacitive coupling to sensing electronics.

The component 10 also has a second, or lower, shielding layer (not shown) which overlaps and extends beyond the signal electrode to shield the side of the signal electrode distal the first shielding electrode.

As shown in FIG. 3 the signal-coupling region 16 is formed as a central electrode square of a connection pad of the coupling section 12. The central electrode square is provided by the signal layer of the sensor 13.

The combination of the continuous bottom shielding electrode (not shown) and a shielding ring-shaped region 20, as shown in FIG. 3, provided by the shielding aperture in the upper shielding layer provides that only the signal-coupling region of the signal electrode is exposed by the two shielding electrodes and ensures that the only part of the electric field propagating from the sensor to the outside environment is through the upper shielding electrode.

However, if a capacitive connection element (not shown) is placed on the top of the connection pad an assembly is formed which provides an electrically shielded coupling for the operational section of the component.

Figures 4, 5:
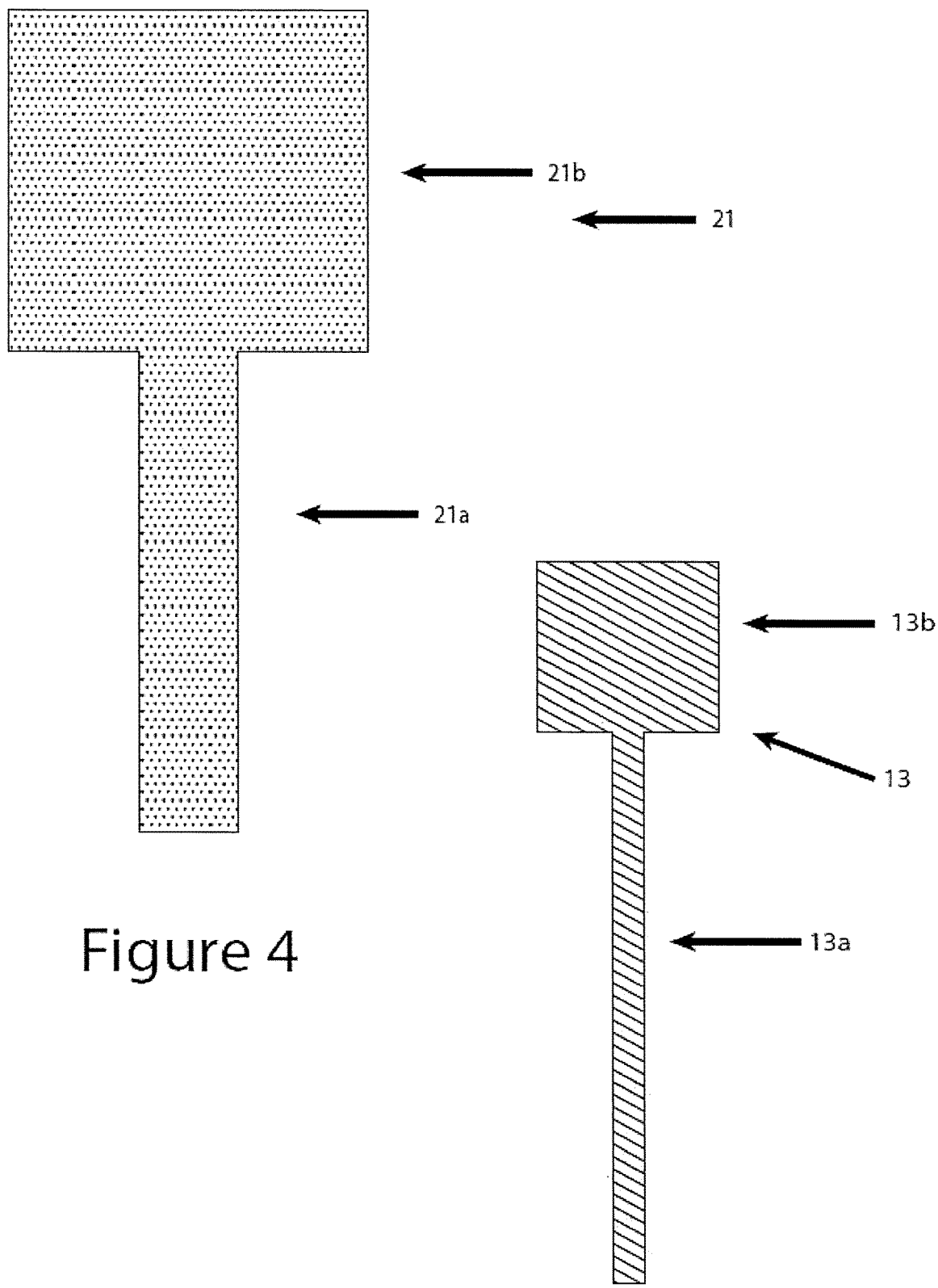
FIG. 4 illustrates the layout of the lower shielding electrode of the component of FIG. 3.
FIG. 5 illustrates the layout of the signal electrode of the of the component of FIG. 3.
Figure 6:
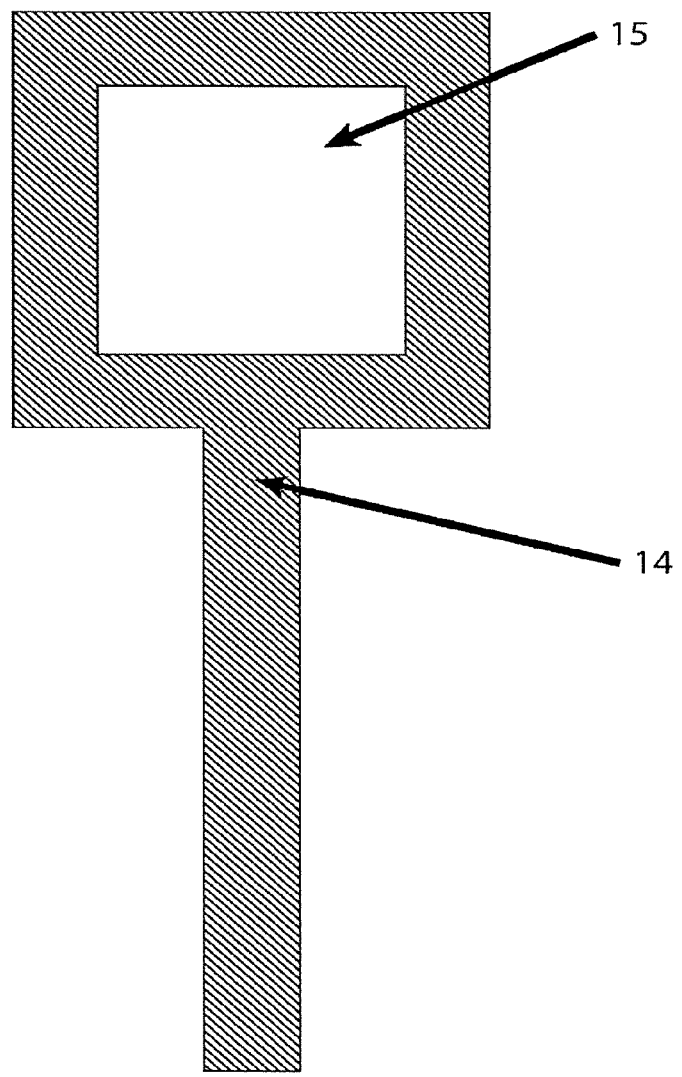
FIG. 6 illustrates the layout of the upper shielding electrode the component of FIG. 3.

FIGS. 4, 5 and 6 show separate layers of electrodes of the component 10.

FIG. 4 illustrates the layout of the lower shielding electrode 21 of the component with coupling section and operational section. The lower shielding electrode 21, as shown, has an operational section 21a which is elongate. In this embodiment the operational section 21a is able to stretch. In this embodiment also the operational section 21b is flexible. The lower shielding electrode 21 has a coupling section 21b which is wider than the functional section.

FIG. 5 illustrates the layout of the signal electrode 13 of the of the component with operational section 13 a and operational section 13b. The operational section 13a is of this embodiment is able to stretch and is flexible also. The coupling region 13 defines a signal-coupling region 16 which is wider, in this embodiment, than the operational section.

The signal electrode 13b has dimensions which, when the signal electrode 13 and lower shielding electrode 18 are aligned, mean the signal electrode is entirely within the periphery of the lower shielding electrode. This allows the lower shielding electrode to provide shielding underneath, as shown, the signal electrode.

FIG. 6 illustrates the layout of the upper shielding electrode 14 of the component with operational section 14a and coupling section 14b. The signal electrode 13 has dimensions which, when the signal electrode 13 and upper shielding electrode 14 are aligned, mean the signal electrode 13 is entirely within the periphery of the upper shielding electrode 14. This allows the upper shielding electrode to provide shielding from above, as shown, the signal electrode.

FIG. 5 shows the shielding electrode 14 defining the signal-coupling, or shield-aperture, 15 which exposes the coupling region 16 of the signal electrode 13 of the component.

Figure 7:
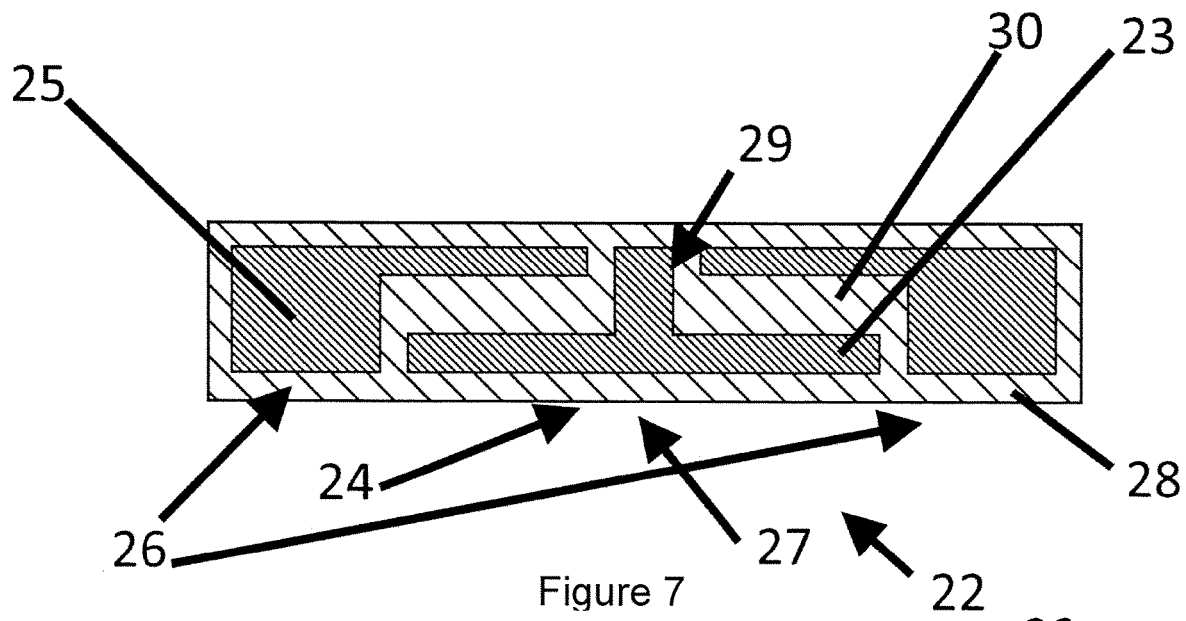
FIG. 7 shows an elevational cross-section of a coupling section of a component according to a further embodiment of the present invention.

FIG. 7 shows an elevational cross-section of a connection or coupling element 22 which co-operates with the component 10, shown illustrated with reference to FIG. 3 to capacitively couple the signal electrode 13 of the component 10 to sensing electronics (not shown) and to capacitively couple the shielding electrode 14 of the component 10.

The coupling element provides shielded connection of signals from the signal electrode, referenced to the shielding electrode 14, to sensing electronics without a need for conductive contact, and may be referred to as a connection element. In this embodiment the coupling element is formed as a plate.

The element 22 has a signal electrode layer 19 which is continuous and provides a signal-coupling region 24 to co-operate with the signal-coupling region 16 of the component 10 illustrated with reference to FIG. 3.

The coupling element 22 has a shielding electrode layer 25. The shielding electrode 25 of the embodiment shown is formed as a ring or annulus 26 which overlaps and extends beyond the signal electrode 19 and extends about the signal electrode 23. The annulus defines an aperture 27 to expose the electrode 23 at a signal-coupling region of the coupling element 22. The annulus provides a shielding-coupling region 26 of the coupling element 22 as well as providing shielding for the signal electrode 25 of the coupling element 22.

In this embodiment the 3-dimensional shape of the shielding electrode of the coupling element is formed by two films of elastomeric material with conductive properties.

The annulus also provides an aperture 29 for external connection of the signal electrode 23 of the coupling element.

The signal-coupling region 26 of the coupling element 22 and the shielding coupling region 26 of the coupling element provide cooperating regions for respective signal-coupling region 16 and shielding coupling region 20 of the of the component 10.

An electric field from the signal electrode 14 can propagate out of the connection element only at the signal-coupling region 16. However, when the connection plates 22 is brought to the coupling section 12 of the of the component 10 the electric field is shielded to within the confinement of the assembly formed by the component 10 and coupling element.

FIG. 7 also shows the encapsulating layer 28 of dielectric material covering the signal electrode 13 and shielding electrode. Therefore, the electrodes 23 and 25 are isolated in terms of direct electrical contact from the surrounds.

In this embodiment the electrodes 23 and 25 are separated by the dielectric material 30. The layer 28 provides a dielectric layer between electrodes of the component 10 and coupling element 22. In use the coupling element 22 is placed in proximity over the coupling section 12 of the component 10 with co-operating electrodes 13 and 19 aligned and cooperating electrodes 14 and 25 aligned.

A capacitance is formed between the proximate electrodes 13 and 23, in the signal-coupling regions 16 and 24, separated by the encapsulating dielectric material 18 and 28. The capacitance provides a first capacitive coupling or signal capacitive coupling. A signal from the signal electrode 13 in the operational section is connected the signal capacitive coupling to sensing electronics (not shown).

A capacitance formed by the shielding electrodes 14 and 25, which are also separated by the encapsulating layer 28. This allows a capacitive coupling of the shielding electrode 14 to sensing electronics for grounding or use as a reference. The reader will appreciate that any reference or grounding will be subject to high-pass characteristics, for example, of the shield-coupling capacitance.

FIG. 7 shows the signal electrode 23 at the signal coupling region to be flush, or substantially in the same plane, as the shielding electrode 25 at the shielding-coupling region. This allows a separation between co-operating electrodes of the component or a coupling element to similar, and minimised, for both signal coupling at the signal-coupling region and shielding coupling at the shielding coupling region.

As shown in FIG. 7 the signal electrode 23 is substantially surrounded by a single shielding electrode 25 which extends about the signal-coupling region 24 of the signal electrode 23 in the same plane to provide a shielding-coupling region 26 and also extends about the shielding electrode to provide shielding on a side of the signal electrode distal from the side where it is exposed at signal-coupling region.

FIG. 7 shows a small gap in the shielding electrode left open to allow connection to the signal layer from the rear side, opposite the side exposed to the coupling element (not shown). This may be connection to the rest of the signal electrode in the operational section.

Figure 8:
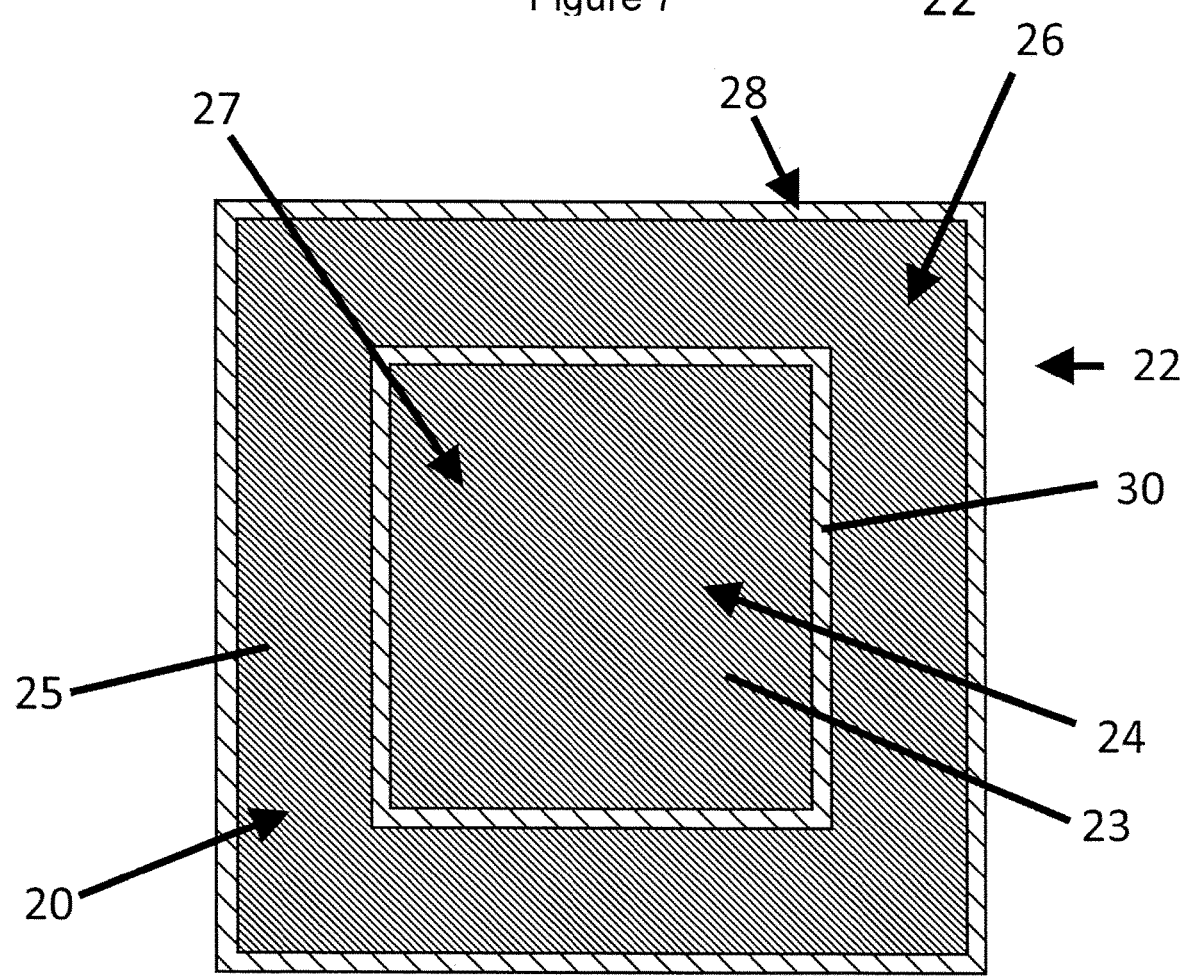
FIG. 8 shows a plan view of a coupling section of a component according to a further embodiment of the present invention.

The plan view of the coupling element given by FIG. 8 illustrates the signal electrode, or ground layer, extending about the side and rear of the signal electrode. In this embodiment the signal-coupling region of the coupling element is surrounded by the shielding-coupling region of the coupling element.

In the embodiment shown in FIGS. 7 and 8 the signal-coupling region and shielding coupling region are arranged substantially at a flat coupling-face of the coupling element. This allows the coupling face to abut a co-operating face of a component 10 to bring both the signal-electrodes and the shielding electrodes of the coupling element and component to close proximity to form capacitances over the dielectric encapsulating layers to allow capacitive coupling of the signal electrodes and the shielding electrodes.

The reader will observe when comparing FIGS. 3 and 8 that capacitive coupling of the signal electrodes of the component and the signal electrodes of the coupling element, or coupling-signal electrodes, are aligned rotationally and brought into proximity in the direction into the page as shown when the coupling element is located against the coupling section of the component. The reader will also observe that the same alignment and proximity will allow the shielding electrode of the component and the shielding electrode of the coupling element, or coupling-shielding electrode, to capacitively couple.

Figure 9:
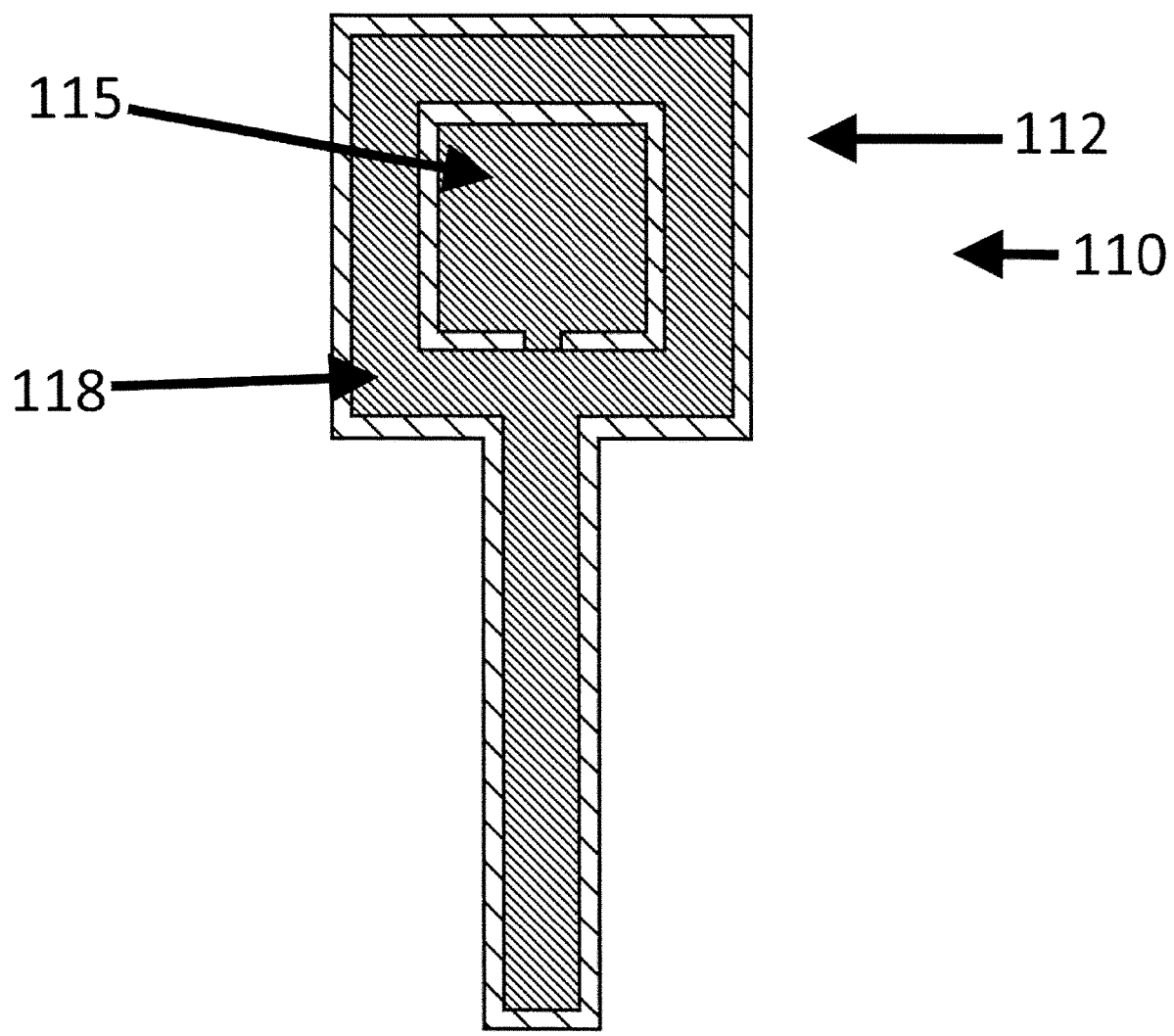
FIG. 9 shows a plan view of a coupling element according to a further embodiment of the present invention.

FIG. 9 shows a further embodiment of the present invention in the form of a component 110 in which the lower electrode 118 defines an aperture 115 similarly to the upper electrode (not shown) and similarly to the upper electrode of the embodiment illustrated with reference to FIG. 3.

In this embodiment a coupling element (not shown) couples to both opposite surfaces of the component 110, sandwiching the coupling section 112 of the component 110.

Further and additional embodiments will now be described.

In various embodiments the signal-coupling region and shielding-coupling region collectively form a face. In various embodiments the face is substantially flat.

Embodiments of the present invention provide a capacitive strain sensor which requires only one capacitive connection plate to couple to a coupling element and/or other component connected to the coupling element.

In alternative embodiments one or other of the coupling section and coupling element are not covered by dielectric material so co-operating electrodes are separated by one of the layers, illustrated as 18 or 28 above.

In alternative embodiments electrodes at a face of a coupling section or coupling element may have a surface arrangement other than flush with each other.

In some embodiments the coupling regions of shielding electrode are arranged about the signal-coupling region or the signal-coupling aperture on either side.

In some embodiments the coupling regions of shielding electrode are arranged about the signal-coupling region or the signal-coupling aperture by extending substantially around.

In some embodiments the coupling regions of shielding electrode are arranged about the signal-coupling region or the signal-coupling aperture arranged to form a continuous region.

In some embodiments the coupling regions of shielding electrode are arranged about the signal-coupling region or the signal-coupling aperture arranged to form a contiguous number of regions.

In some embodiments the coupling regions of shielding electrode are arranged about the signal-coupling region or the signal-coupling aperture in substantially the same plane.

In some embodiments the coupling regions of shielding electrode are arranged about the signal-coupling region or the signal-coupling aperture in a space about the region, aperture or electrode.

Embodiments of the invention provide a stretchable and flexible component which having a sensor and provide a coupling element comprising a plate which is able to abut the component to form separate capacitances with both a signal electrode of the component and shielding electrode of the component to separately capacitively couple the signal electrode and shielding electrode of the component to sensing circuitry, for example, or to couple the signal electrode to sensing circuitry and couple the shielding electrode to a reference such as ground.

Alternative embodiments may have more than one contiguous signal-coupling region and/or shielding coupling region on the component or coupling element. The reader will appreciate that there may be trade-offs to contiguous regions that may substantially provide similar function but may provide other advantages for specific applications.

In one alternative embodiment differs from the embodiment of FIG. 3 by requiring two connection plates to form a completely shielded assembly. In this embodiment both the top and bottom shielding electrodes form rings around a central signal-coupling region of the signal electrode of the component. This allows the electric field of the signal electrode to propagate from the sensor on both the top and bottom side. However, when connection plates are placed on both the top and bottom side the assembly becomes a shielded assembly. A benefit of two connection plates is the increase in capacitance between the sensor and the connection plates.

In various alternative embodiments a coupling plate is substituted by a deformable and/or flexible and/or stretchable element.

In alternative embodiments the shield aperture may be narrower and/or shorter that a signal-coupling region of the signal electrode so that only part of the signal-coupling region is exposed by the upper shielding electrode.

In some embodiments a reference electrode provides a reference for a signal at a signal electrode.

In some embodiments a shielding electrode partially overlaps a signal electrode to provide a degree of shielding for the signal electrode.

In some embodiments a soft electronic component is formed of films of elastomeric material. In some embodiments the component comprises elastomeric material to provide dielectric layers or patterns and elastomeric material with dispersed material to provide conductive layers or patterns. In some embodiments the material of both dielectrics and conductors is silicone.

Various embodiments provide an electrical characteristic which varies with deformation.

In some embodiments the electrical characteristic is capacitance. In various embodiments an electrical characteristic is capacitance.

In some of these embodiments the capacitances are in the range of hundreds of Picofarads.

In various embodiments an electrical characteristic to be used is inductance.

In various embodiments the electrical characteristic is a characteristic which is referenced to earth or to a shielding electrode. For example capacitance of a signal electrode which stretches may be the capacitance between the signal electrode and one or more shielding electrodes and may be a result of deformation in both the shielding electrode and the signal electrode as well as, in some cases, dielectric layers separating these.

In some embodiments variation in electrical characteristic is used for sensing deformation or changes in deformation.

In some embodiments variation in electrical characteristic is used for generating power. In some embodiments power is generated by holding a priming charge while the electrical characteristic changes.

In some embodiments soft electronic components are used to generate mechanical force.

In some embodiments material used to provide a soft electronic component such as a sensor is a matrix material.

In some embodiments the material used to provide a soft electronic component such as a sensor is an elastic material.

In some embodiments material used to provide a soft electronic component such as a sensor is a silicone-based material.

In some embodiments electrodes are formed using a matrix similar to that of dielectric layers.

In some embodiments the electrodes are conductive due to conductive materials, such as particles, being added to a material.

In some embodiments the material of the electrodes and the material of dielectric layers have a similar stretch and/or compliance and/or elastic properties.

In some embodiments the electrical device is formed of films of materials. In some embodiments layers or films of materials are formed of material which is initially liquid and then set or cured.

Some embodiments use a step of casting to manufacture a layer of a sensor. The casting step of some embodiments uses a cast into which a material to be deposited is applied. In some embodiments the casting step is used to apply a layer of conductive material in a defined pattern. The casing may use casts as pattern elements, which define patterns. The resulting product of some embodiments has a layer of the sensor defined by a cast. Some embodiments have a cast layer.

Some embodiments have steps in a process which uses patterning sheet in the form of a stencil to deposit a layer of an integrated sensor and/or a pattern of signal electrodes and cable conductors. The stenciling of some embodiments uses stencils as pattern elements, which define patterns for layers and/or a pattern of sensors. Some embodiments have a resulting product with a stenciled layer.

Some embodiments have steps in a process which uses a patterning sheet in the form of a screen to deposit by screen printing a layer of an integrated sensor and/or a pattern of signal electrodes and cable conductors. The printing of some embodiments uses screens as pattern elements, which define patterns for layers and/or a pattern of sensors. Some embodiments have a resulting product with a screen-printed layer.

Some embodiments have steps in a process which uses digital printing to deposit a layer of an integrated sensor and/or a pattern of signal electrodes and cable conductors. The printing of some embodiments uses computer controlled dispensing heads as pattern elements, which define patterns for layers and/or a pattern of sensors. Some embodiments have a resulting product with a digitally printed layer.

Some embodiments have steps in a process which uses flexography printing to deposit a layer of a sensor and/or a pattern of signal electrodes and cable conductors. The printing of some embodiments uses raised surfaces on planar or rotary tools as pattern elements, which define patterns for layers and/or a pattern of sensors. Some embodiments have a resulting product with a flexographic layer.

Some embodiments have steps in a process which uses gravure to deposit a layer of a sensor and/or a pattern of signal electrodes and cable conductors. The printing of some embodiments uses embossed patterns on rotary tools as pattern elements, which define patterns for layers and/or a pattern of sensors. Some embodiments have a resulting product with a gravure layer.

Some embodiments have steps in a process which uses offset lithography to deposit a layer of an integrated sensor and/or a pattern of signal electrodes and cable conductors. The printing of some embodiments uses a series of rollers to transfer liquids to a substrate in patterns defined to describe a pattern of layers and/or a pattern of sensors. Some embodiments have a resulting product with an offset lithography layer.

Some embodiments have steps in a process which uses lamination to deposit a prefabricated layer of an integrated sensor and/or a pattern of signal electrodes and cable conductors. The lamination of some embodiments uses prefabricated patterned layers, which define patterns for layers and/or a pattern of sensors and/or cables. Some embodiments have a resulting product with a laminated layer.

Some embodiments of the invention have steps in a process which uses spray deposition, implantation or injection of materials.

Some embodiments of the invention have steps in a process which uses digital printing such as inkjet printing.

Some embodiments have a circuit or processor which determines an electrical characteristic, such as capacitance, for a signal electrode and/or a change in an electrical characteristic determined for a signal electrode and does this dependent on an electrical characteristic and/or change in electrical characteristic determined for a cable connecting the signal electrode to a circuit. The determination dependent on in some embodiments is a deduction. In some embodiments the deduction or other determination is determined dependent on an electrical characteristic and/or change in electrical characteristic for a signal electrode associated with the cable conductor. In some embodiments the signal electrode may be associated geometrically with the cable conductor. In some embodiments the cable conductor may run alongside a signal electrode or sequence of signal electrodes so that the deformation, such as stretching or compression, occurring in the cable can be determined from the deformation occurring in the signal electrode. The reader will appreciate that deformation will involve deformation in cable conductors, signal electrodes and shielding electrodes and/or dielectric layers.

Embodiments of the invention provide an improved signal transmission apparatus which did not rely on a direct physical or mechanical connection to the conductive structures of a soft flexible electrical component, and which could provide a consistent repeatable connection which minimised the chances of variation in results obtained from the electrical component.

The reader will appreciate that capacitive coupling allows a gap between co-operating electrodes. This occurs in embodiments illustrated when the faces of the coupling section and coupling element are brought into alignment align cooperating regions or apertures and when the faces are brought into proximity. Here the term "proximity" may include contact of the faces or any arrangement which brings co-operating electrodes into proximity suitable to form a capacitance.

In the preceding description and the following claims the word "comprise" or equivalent variations thereof is used in an inclusive sense to specify the presence of the stated feature or features. This term does not preclude the presence or addition of further features in various embodiments.

It is to be understood that the present invention is not limited to the embodiments described herein and further and additional embodiments within the spirit and scope of the invention will be apparent to the skilled reader from the examples illustrated with reference to the drawings. In particular, the invention may reside in any combination of features described herein or may reside in alternative embodiments or combinations of these features with known equivalents to given features. Modifications and variations of the example embodiments of the invention discussed above will be apparent to those skilled in the art and may be made without departure of the scope of the invention as defined in the appended claims.

In the preceding description and the following claims the word "comprise" or equivalent variations thereof is used in an inclusive sense to specify the presence of the stated feature or features. This term does not preclude the presence or addition of further features in various embodiments.

It is to be understood that the present invention is not limited to the embodiments described herein and further and additional embodiments within the spirit and scope of the invention will be apparent to the skilled reader from the examples illustrated with reference to the drawings. In particular, the invention may reside in any combination of features described herein, or may reside in alternative embodiments or combinations of these features with known equivalents to given features. Modifications and variations of the example embodiments of the invention discussed above will be apparent to those skilled in the art and may be made without departure of the scope of the invention as defined in the appended claims.

What we claim is:

1. A signal transmission system, the signal transmission system comprising:
    a first electronic component; and
    a second electronic component,
    wherein the first electronic component comprises:
        a signal electrode;
        one or more shielding electrodes;
        one or more dielectric films separating the signal electrode from each of the one or more shielding electrodes; and
        a first coupling section at a face of the first electronic component,
        wherein at least a part of the one or more shielding electrodes is positioned outside an edge of the signal electrode to shield the signal electrode,
    wherein, at the first coupling section:
        one or more of the one or more shielding electrodes defines a first signal-coupling region where the signal electrode is not shielded by the one or more shielding electrodes; and
        one or more of the one or more shielding electrodes defines a first shielding-coupling region,
    wherein the second electronic component comprises:
        a coupling-signal electrode;
        one or more coupling-shielding electrodes;
        one or more dielectric films separating the coupling-signal electrode from each of the one or more coupling-shielding electrodes; and
        a second coupling section at a face of the second electronic component,
        wherein at least a part of the one or more coupling-shielding electrodes is positioned outside an edge of the coupling-signal electrode to shield the coupling-signal electrode,
    wherein, at the second coupling section:
        one or more of the one or more coupling-shielding electrodes defines a second signal-coupling region where the coupling-signal electrode is not shielded by the one or more coupling-shielding electrodes; and
        one or more of the one or more coupling-shielding electrodes defines a second shielding-coupling region,
    wherein the second signal-coupling region has a co-operating shape with the first signal-coupling region such that the signal electrode and the coupling-signal electrode capacitively couple when the first and second signal-coupling regions are aligned and the face of the first electronic component is proximate the face of the second electronic component, and
    wherein the second shielding-coupling region has a co-operating shape with the first shielding-coupling region such that the shielding electrode and the coupling-shielding electrode capacitively couple when the first and second signal-coupling regions are aligned and the face of the first electronic component is proximate the face of the second electronic component.

2. A signal transmission system as claimed in claim 1, wherein one or both of the first electronic component and second electronic component are flexible.

3. A signal transmission system as claimed in claim 1, wherein one or both of the first and second signal-coupling regions and one or both of the first and second shielding-coupling regions are covered by dielectric material to isolate the respective signal electrodes and the respective shielding electrodes from conductive contact with the environment.

4. A signal transmission system as claimed in claim 1, wherein a first shielding electrode of the one or more shielding electrodes is arranged to provide the first shielding-coupling region around the signal-coupling region.

5. A signal transmission system as claimed in claim 1, wherein a first shielding electrode of the one or more shielding electrodes is arranged on a first side of the signal electrode.

6. A signal transmission system as claimed in claim 5, wherein a second shielding electrode of the one or more shielding electrodes is arranged on a second side of the signal electrode, the second side being opposite to the first side, and wherein the second shielding electrode substantially covers the signal electrode on the second side to provide continuous shielding for the signal electrode on the second side.

7. A signal transmission system as claimed in claim 2, wherein the one or more shielding electrodes are formed of layers of stretchable and/or compliant material.

8. A signal transmission system as claimed in claim 1, wherein the signal electrode and the one or more shielding electrodes are formed of films of material comprising an additive to impart a conductive property to an otherwise dielectric material.

9. A signal transmission system as claimed in claim 8, wherein the films of material comprise one or more films of elastomeric material.

10. A signal transmission system as claimed in claim 1, wherein the first electronic component comprises a sensor section, the sensor section being able to deform to change geometry of the signal electrode and the one or more shielding electrodes to change an electrical property of the sensor section to allow sensing of deformation.

11. A signal transmission system as claimed in claim 10, wherein the one or more shielding electrodes overlap with the signal electrode in the sensor section.

12. An electronic component for a signal transmission system, the electronic component comprising:
  a signal electrode;
  one or more shielding electrodes;
  one or more dielectric films separating the signal electrode from each of the one or more shielding electrodes; and
  a coupling section at a face of the electronic component,
  wherein at least a part of the one or more shielding electrodes is positioned outside an edge of the signal electrode to shield the signal electrode,
  wherein, at the coupling section:
    one or more of the one or more shielding electrodes defines a signal-coupling region where the signal electrode is not shielded by the one or more shielding electrodes; and
    one or more of the one or more shielding electrodes defines a shielding-coupling region,
  wherein the signal-coupling region has a shape configured to co-operate with a further signal-coupling region of a further electronic component such that the signal electrode capacitively couples with a coupling-signal electrode of the further electronic component when the signal-coupling region and the further signal-coupling region are aligned and the face of the electronic component is proximate a face of the further electronic component, and
  wherein the shielding-coupling region has a shape configured to co-operate with a further shielding-coupling region of the further electronic component such that the shielding electrode capacitively couples with a coupling-shielding electrode of the further electronic component when the signal-coupling region and the further signal-coupling region are aligned and the face of the electronic component is proximate a face of the further electronic component.

* * * * *